(12) United States Patent
Ng et al.

(10) Patent No.: US 9,422,176 B2
(45) Date of Patent: Aug. 23, 2016

(54) SYSTEMS AND TECHNIQUES FOR ELECTRODIALYSIS

(75) Inventors: Kee Hoe Ng, Singapore (SG); Rongqiang Fu, Singapore (SG); Li-Shiang Liang, Harvard, MA (US); Zhee Min Jimmy Yong, Singapore (SG); Keng Hoo Yeo, Singapore (SG)

(73) Assignee: Evoqua Water Technologies Pte. Ltd., Singapore (SG)

( * ) Notice: Subject to any disclaimer, the term of this patent is extended or adjusted under 35 U.S.C. 154(b) by 676 days.

(21) Appl. No.: 13/110,329

(22) Filed: May 18, 2011

(65) Prior Publication Data

US 2011/0284376 A1   Nov. 24, 2011

Related U.S. Application Data

(60) Provisional application No. 61/345,740, filed on May 18, 2010, provisional application No. 61/359,022, filed on Jun. 28, 2010.

(51) Int. Cl.
| | | |
|---|---|---|
| *B01D 61/44* | (2006.01) | |
| *C02F 1/469* | (2006.01) | |
| *B01D 61/46* | (2006.01) | |
| *B01D 61/50* | (2006.01) | |
| *B01D 61/54* | (2006.01) | |
| *B01D 63/08* | (2006.01) | |
| *B01D 63/10* | (2006.01) | |
| *C02F 1/461* | (2006.01) | |

(52) U.S. Cl.
CPC .............. *C02F 1/4693* (2013.01); *B01D 61/46* (2013.01); *B01D 61/50* (2013.01); *B01D 61/54* (2013.01); *B01D 63/084* (2013.01); *B01D 63/10* (2013.01); *B01D 2311/14* (2013.01); *B01D 2311/243* (2013.01); *B01D 2311/246* (2013.01); *B01D 2313/14* (2013.01); *C02F 2001/46138* (2013.01); *C02F 2201/4612* (2013.01); *C02F 2201/4613* (2013.01); *C02F 2301/066* (2013.01); *C02F 2303/24* (2013.01); *Y02W 10/33* (2015.05); *Y02W 10/37* (2015.05)

(58) Field of Classification Search
USPC .................................. 204/524–535, 631–636
See application file for complete search history.

(56) References Cited

U.S. PATENT DOCUMENTS

| | | | | |
|---|---|---|---|---|
| 2,891,899 A | * | 6/1959 | Mason et al. ................ | 204/630 |
| 3,318,795 A | | 5/1967 | Mintz et al. | |
| 3,384,568 A | * | 5/1968 | Masaaki Kato et al. ...... | 204/634 |
| 4,033,850 A | | 7/1977 | Kedem et al. | |
| 5,681,438 A | * | 10/1997 | Proulx ......................... | 204/627 |
| 5,736,023 A | | 4/1998 | Gallagher et al. | |
| 5,891,328 A | | 4/1999 | Goldstein | |
| 2004/0060823 A1 | * | 4/2004 | Carson et al. ................ | 204/627 |
| 2007/0138008 A1 | * | 6/2007 | Carson ......................... | 204/295 |

FOREIGN PATENT DOCUMENTS

EP         0645176 A1     3/1995

* cited by examiner

*Primary Examiner* — Arun S Phasge

(57) ABSTRACT

Electrochemical separation devices are configured for lower energy consumption. Techniques for reducing shadow effect may involve providing distance between a spacer screen and an adjacent ion-selective membrane. A spacer having a screen that is thin relative to a surrounding frame may be used. Mild pressure may also be applied to a compartment to promote distance between a spacer screen and an adjacent ion-selective membrane.

19 Claims, 8 Drawing Sheets

SYSTEMS AND TECHNIQUES FOR ELECTRODIALYSIS

CROSS-REFERENCE TO RELATED APPLICATIONS

This application claims priority under Section 119 to U.S. Provisional Application Ser. No. 61/345,740 filed on May 18, 2010 titled ELECTRODIALYSIS SPACER AND SCREEN CONFIGURATION FOR LOWER ENERGY CONSUMPTION, and to U.S. Provisional Application Ser. No. 61/359,022 filed on Jun. 28, 2010 titled ELECTRODIALYSIS SPACER WITH CAPS IN INLET AND OUTLET AREAS, the entire disclosure of each of which is hereby incorporated herein by reference in its entirety for all purposes.

FIELD OF THE TECHNOLOGY

Aspects relate generally to electrochemical separation and, more particularly, to electrodialysis systems and techniques configured for lower energy consumption.

BACKGROUND

Devices capable of treating liquid streams with an applied electrical field to separate ionic species therein are known. These electrically-motivated separation apparatus including, but not limited to, electrodialysis and electrodeionization devices are conventionally used to generate purified water.

Within these devices are concentrating and diluting compartments separated by ion-selective membranes. An electrodialysis device typically includes alternating electroactive semipermeable anion and cation exchange membranes. Spaces between the membranes are configured to create liquid flow compartments with inlets and outlets. An applied electric field imposed via electrodes causes dissolved ions, attracted to their respective counter-electrodes, to migrate through the anion and cation exchange membranes. This generally results in the liquid of the diluting compartment being depleted of ions, and the liquid in the concentrating compartment being enriched with the transferred ions.

SUMMARY

Aspects relate generally to electrochemical systems and techniques for lower energy consumption.

In accordance with one or more aspects, an electrically driven separation device may comprise a first compartment at least partially defined by a first ion selective membrane and a second ion selective membrane, and a spacer comprising a screen, the spacer positioned between the first and second ion selective membranes and constructed and arranged to maintain separation between the screen and each of the first and second ion selective membranes.

In some aspects, the screen may be surrounded by a frame that is thicker than the screen. In at least some aspects, the screen may be substantially centered within the first compartment relative to the first and second ion selective membranes. In some aspects, the screen may be positioned at an inlet channel and an outlet channel of the first compartment. In one or more aspects, the device may further comprise a cap constructed and arranged to cooperate with the spacer to support the first ion selective membrane. In some aspects, the screen may be thicker towards at least one of an inlet channel and an outlet channel of the first compartment relative to a remainder of the first compartment. In some aspects, the device may further comprise a second compartment at least partially defined by the second ion selective membrane and a third ion selective membrane. The first compartment may comprise a dilute compartment and the second compartment comprises a concentrate compartment. A second spacer may comprise a second screen. The second spacer may be positioned between the second and third ion selective membranes and constructed and arranged to maintain separation between the second screen and the second and third ion selective membranes. In some aspects, the screen may be about 0.002 inch to about 0.02 inch thinner than the frame.

In accordance with one or more aspects, a method of treating water may comprise introducing the water to at least a first compartment of an electrically driven separation device, promoting separation of a spacer screen from an adjacent ion selective membrane in the electrically driven separation device, promoting transport of an ionic species in the water from the first compartment to a second compartment of the electrically driven separation device, and recovering treated water at an outlet of the first compartment.

In some aspects, promoting separation may comprise applying pressure to the first compartment. In at least some aspects, the method may further comprise reversing polarity of an electric current applied through the electrically driven separation device. In other aspects, the method may further comprise monitoring a concentration of the ionic species in the treated water.

In accordance with one or more aspects, a method of reducing energy consumption of an electrodialysis device by at least about 10% may comprise reducing shadow effect in a compartment of the electrodialysis device.

Still other aspects, embodiments, and advantages of these exemplary aspects and embodiments, are discussed in detail below. Moreover, it is to be understood that both the foregoing information and the following detailed description are merely illustrative examples of various aspects and embodiments, and are intended to provide an overview or framework for understanding the nature and character of the claimed aspects and embodiments. The accompanying drawings are included to provide illustration and a further understanding of the various aspects and embodiments, and are incorporated in and constitute a part of this specification. The drawings, together with the remainder of the specification, serve to explain principles and operations of the described and claimed aspects and embodiments.

BRIEF DESCRIPTION OF THE DRAWINGS

Various aspects of at least one embodiment are discussed below with reference to the accompanying figures. In the figures, which are not intended to be drawn to scale, each identical or nearly identical component that is illustrated in various figures is represented by a like numeral. For purposes of clarity, not every component may be labeled in every drawing. The figures are provided for the purposes of illustration and explanation and are not intended as a definition of the limits of the invention. In the figures.

DETAILED DESCRIPTION

Figure 1:
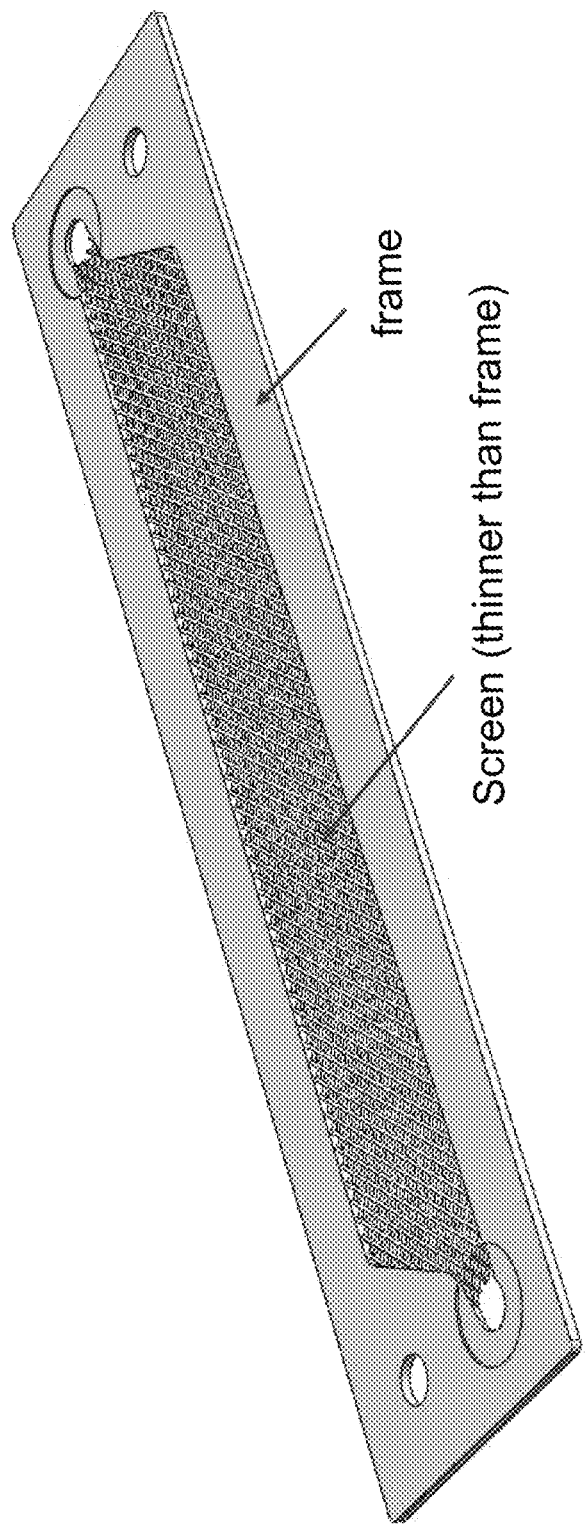
FIG. 1 presents a schematic drawing of an ion-selective membrane spacer in accordance with one or more embodiments.

In accordance with one or more embodiments, a water treatment system may include one or more electrochemical separation devices. Non-limiting examples of electrical separation devices, or electrically-driven separation apparatus, include electrodialysis and electrodeionization devices. Typically within these exemplary devices are concentrating and diluting compartments separated by media having selective permeability, such as anion-selective and cation-selective membranes. In these devices, an applied electric field causes ionizable species, dissolved ions, to migrate through the selectively permeable media, i.e., anion-selective and cation-selective membranes, resulting in the liquid in the diluting compartment being depleted of ions, and the liquid in the concentrating compartment being enriched with the migrant, transferred ions. In some embodiments, an electrochemical separation device may include media within one or more compartments within the device, such as one or more concentrating and diluting compartments. Solid "media" (e.g., electro-active media or adsorption media, such as ion exchange media) may provide a path for ion transfer, and/or serves as an increased conductivity bridge between the selective membranes to facilitate movement of ions within compartments of the device. In other embodiments, such as those involving electrodialysis, at least some of the compartments may not include selective media. In at least one embodiment, none of the compartments of the electrochemical separation device include selective media.

Electrochemical separation is a process that removes, or at least reduces, one or more ionized or ionizable species from water using electrically active media and an electric potential to influence ion transport. The electrically active media typically serves to alternately collect and discharge ionic and/or ionizable species and, in some cases, to facilitate the transport of ions, which may be continuous, by ionic or electronic substitution mechanisms. Electrochemical separation devices can comprise electrochemically active media of permanent or temporary charge, and may be operated batchwise, intermittently, continuously, and/or in reversing polarity modes. Electrochemical separation devices may be operated to promote one or more electrochemical reactions specifically designed to achieve or enhance performance. Further, such electrochemical separation devices may comprise electrically active membranes, such as semi-permeable or selectively permeable ion exchange or bipolar membranes.

Electrodialysis (ED) devices generally do not contain electroactive media between the ion selective membranes. Because of the lack of elecroactive media, the operation of ED may be hindered on feed waters of low salinity because of elevated electrical resistance. Also, because the operation of ED on high salinity feed waters can result in elevated electrical current consumption, ED apparatus have heretofor been most effectively used on source waters of at least intermediate salinity. In ED based systems, because there is no electroactive media, splitting water is inefficient and operating in such a regime is generally avoided. A variation on ED is electrodialysis reversal (EDR) in which the direction of ion flow is reversed by reversing the polarity of applied electric current. Another variation is reverse electrodialysis (RED) in which salinity gradient energy is retrieved from the chemical potential difference between salt and fresh water across alternating cathode and anode selective membranes.

In ED devices, a plurality of adjacent cells or compartments are typically separated by selectively permeable membranes that allow the passage of either positively or negatively charged species, but typically not both. Dilution or depletion compartments are typically interspaced with concentrating or concentration compartments in such devices. As water flows through the depletion compartments, ionic and other charged species are typically drawn into concentrating compartments under the influence of an electric field, such as a direct current (DC) field. Positively charged species are drawn toward a cathode, typically located at one end of a stack of multiple depletion and concentration compartments, and negatively charged species are likewise drawn toward an anode of such devices, typically located at the opposite end of the stack of compartments. The electrodes are typically housed in electrolyte compartments that are usually partially isolated from fluid communication with the depletion and/or concentration compartments. Once in a concentration compartment, charged species are typically trapped by a barrier of selectively permeable membrane at least partially defining the concentration compartment. For example, anions are typically prevented from migrating further toward the cathode, out of the concentration compartment, by a cation selective membrane. Once captured in the concentrating compartment, trapped charged species can be removed in a concentrate stream.

The electric field applied to the device is typically DC. However, any applied current that creates a bias or potential difference between one electrode and another can be used to promote migration of the ionic species within the device. The DC field is typically applied to the cells from a source of voltage and electric current applied to the electrodes (anode or positive electrode, and cathode or negative electrode). The voltage and current source (collectively "power supply") can be itself powered by a variety of means such as an AC power source, or for example, a power source derived from solar, wind, or wave power. At the electrode/liquid interfaces, electrochemical half cell reactions occur that initiate and/or facilitate the transfer of ions through the membranes and compartments. The specific electrochemical reactions that occur at the electrode/interfaces can be controlled to some extent by the concentration of salts in the specialized compartments that house the electrode assemblies. For example, a feed to the anode electrolyte compartments that is high in sodium chloride will tend to generate chlorine gas and hydrogen ion, while such a feed to the cathode electrolyte compartment will tend to generate hydrogen gas and hydroxide ion. Generally, the hydrogen ion generated at the anode compartment will associate with a free anion, such as chloride ion, to preserve charge neutrality and create hydrochloric acid solution, and analogously, the hydroxide ion generated at the cathode compartment will associate with a free cation, such as sodium, to preserve charge neutrality and create sodium hydroxide solution. In accordance with some embodiments, the reaction products of the electrode compartments, such as generated chlorine gas and sodium hydroxide, can be utilized in the process as needed for disinfection purposes, for membrane cleaning and defouling purposes, and for pH adjustment purposes.

In accordance with one or more embodiments, the electrochemical device may be operated by applying an electric field across the compartments through electrodes. Operating parameters of the device may be varied to provide desirable characteristics. For example, the applied electric field may be varied in response to one or more characteristics or conditions. Thus, the electric field strength may be held constant or altered in response to a characteristic of the apparatus or a process stream thereof. Indeed, the one or more operating parameters may be altered in response to one or more sensor measurements, e.g., pH, resistivity, concentration of an ion or other species. The electric field imposed through electrodes facilitates migration of charged species such as ions from one compartment to another via ion-selective membranes.

In accordance with one or more embodiments, typical configurations of the electrically-driven separation device include at least one electrode pair through which an applied force, such as an electric field, can facilitate transport or migration of the one or more ionic, or ionizable, species. The device can thus comprise at least one anode and at least one cathode. The electrodes may each independently be made out of any material suitable for creating an electric field within the device. In some cases, the electrode material can be chosen such that the electrodes can be used, for example, for extended periods of time without significant corrosion or degradation. Suitable electrode materials and configurations are well known in the art. Electrodes of electrochemical devices may generally include a base or core made of a material such as carbon, platinum, stainless steel or titanium. The electrodes may be coated with various materials, for example, iridium oxide, ruthenium oxide, platinum group metals, platinum group metal oxides, or combinations or mixtures thereof. The electrodes typically promote the formation of hydronium and hydroxide ions. These ions, along with the ions in the various feeds, are transported by the potential across the electrochemical device. The flow of ions is related to the electrical current applied to the module.

In operation, a liquid to be purified, typically having dissolved cationic and anionic components, may be introduced into one or more depleting compartments. An electric field can be applied across one or more compartments of the device, which may promote migration of ionic species towards their respective attracting electrodes. Under the influence of the electric field, cationic and anionic components may leave the depleting compartments and migrate into the concentrating compartments. Ion selective membranes may block or at least inhibit migration of the cationic and anionic species to the next compartment. The electrochemical separation device thus may be used to produce a product that consists essentially of water, and in some cases, is essentially water, i.e., the water may have a trace or undetectable amount of ions, etc., but the water would be considered by those of ordinary skill in the art to be "pure." In some embodiments, the applied electric field creates a polarization phenomenon, which may lead to the dissociation of water into hydrogen and hydroxyl ions, In some embodiments, the electric field may be applied essentially perpendicular to liquid flow within the device. Other directions may also be used. In at least one embodiment, the electric field may be substantially uniformly applied across the compartments, resulting in an essentially uniform, substantially constant electric field across the compartments. In other embodiments, the electric field may be non-uniformly applied, resulting in a non-uniform electric field density across the compartments. In some embodiments, the polarity of the electrodes may be reversed during operation, reversing the direction of the electric field within the device, such as in EDR devices.

In accordance with one or more embodiments, an applied electric field may promote dissociation of water into hydrogen or hydronium ions, as well as hydroxyl ions. The applied electric field may also promote migration of one or more ions within the electrochemical device. The hydrogen, hydroxyl and/or one or more target ions present may migrate. Ionic migration may be across one or more ion-selective membranes of the electrochemical device. Ions may be concentrated or trapped in one or more compartments, for example, based on their charge or nature. The orientation and nature of various ion-selective membranes within the electrochemical device may influence migration therein as well as what type of products may be formed in the various compartments. Streams of generated products may exit the electrochemical device via outlets associated with the various compartments, for example, a product solution outlet and/or a reject solution outlet.

In accordance with one or more embodiments, an electrochemical device may include one or more compartments, such as a first compartment and a second compartment. In one or more embodiments pertinent to aspects directed to electrochemical separation techniques, electrically-driven separation devices may comprise one or more depleting compartments and one or more concentrating compartments. Compartments or cells may generally differ functionally with respect to the type, and/or composition of the fluid introduced therein. Structural differences, however, may also distinguish the various compartments. In some embodiments, a device may include one or more types of depleting compartments and one or more types of concentrating compartments. The nature of any given compartment, such as whether it is a concentrating or depleting compartment, may be generally informed by the types of membranes which border the compartment, as well as the type of feed(s) supplied to the compartment. The nature of neighboring compartments may influence each other. In some embodiments, a compartment may be an electrolyzing compartment. For example, a depleting compartment may be referred to as an electrolyzing compartment. In some embodiments, a concentrating compartment may also be referred to as an electrolyzing compartment. In some embodiments, water splitting may generally occur in an electrolyzing compartment. An electrolyzing compartment may be a water splitting cell. Other ionic interactions may also occur in an electrolyzing compartment.

Membranes typically form borders between adjacent compartments. In some embodiments, the membranes may be ion-selective, ion permeable or permselective membranes. Such membranes may generally allow ions of a particular type of charge to pass through the membrane while inhibiting or preventing passage of ions with different charge or valence or type of charge. The ion-selective membranes may be any suitable membrane that can preferentially allow at least one ion to pass therethrough, relative to another ion. Thus, one or more compartments may be at least partially defined by one or more ion-selective membranes. A plurality of compartments is typically arranged as a stack in the electrochemical device. Spacers may be included between ion selective membranes. A depleting compartment is typically defined by a depleting compartment spacer and a concentrating compartment is typically defined by a concentrating compartment spacer.

An assembled stack is typically bound by end blocks at each end and is typically assembled using tie rods which may be secured with nuts. In certain embodiments, the compartments include cation-selective membranes and anion-selective membranes, which are typically peripherally sealed to the periphery of both sides of the spacers. In some nonlimiting embodiments, cation-selective membranes and anion-selective membranes may comprise ion exchange powder, a polyethylene powder binder and a glycerin lubricant. In some embodiments, the cation- and anion-selective membranes are heterogeneous membranes. These may be polyolefin-based membranes or other type. Membranes may be extruded by a thermoplastic process using heat and pressure to create a composite sheet. In some embodiments, homogeneous membranes may be implemented. Other membranes may be used. The one or more selectively permeable membranes may be any ion-selective membrane, neutral membrane, size-exclusive membrane, or even a membrane that is specifically impermeable to one or more particular ions or classes of ions. In some cases, an alternating series of cation- and anion-selective membranes is used within the electrically-driven apparatus.

In accordance with one or more embodiments, two adjacent ion-selective membranes may form a cell or a compartment. For example, a first ion-selective membrane and a second ion-selective membrane may form a cell. Two cells may form a cell pair. In some embodiments, a dilute compartment and a concentrate compartment may form a cell pair. Other configurations are possible with the cells or cell pairs being characterized by the nature of the bounding ion-selective membranes. An electrochemical separation device may include a stack of cell pairs and therefore a plurality of compartments. In one embodiment, a plurality of compartments can be bounded, separated or at least partially defined by one or more ion-selective membranes. In some embodiments, cation-selective membranes may be designated by "c" and anion-selective membranes may be designated by "a". In some embodiments, ion-selective membranes a and c are arranged as an alternating series of cation-selective membranes (designated as "c") that preferentially allow cations to pass therethrough, relative to anions; and anion-selective membranes (designated as "a") that preferentially allow anions to pass therethrough, relative to cations. In other embodiments, arrangements such as "c c a c" or "a a c a" may be employed. Any combination and arrangement of ion-selective membranes may be used based on an intended application and based on the desired properties of the compartments defined by the ion-selective membranes. Adjacent compartments may be considered to be in ionic communication therebetween, such as via a neighboring ion selective membrane. Distal compartments may also be considered to be in ionic communication, such as via additional compartments therebetween.

A variety of configurations or arrangements may exist within the compartments. Thus, one or more compartments of the separation systems may involve additional components and/or structures such as, but not limited to, baffles, mesh screens, plates, ribs, straps, screens, pipes, carbon particles, carbon filters, which may be used to, in some cases, contain the ion exchange media, and/or control liquid flow. The components may each contain the same type and or/number of the various components and/or be of the same configuration or may have different components and/or structure/configurations. A conventional electrochemical separation apparatus comprises a stage bounded by electrodes. Adjacent to an end plate may be an endblock to house an electrode and desired manifolding. An electrode spacer may be positioned adjacent to the endblock and may include a screen which effects turbulent flow of liquid passing through the electrode spacer. An ion permeable membrane may be sealed to the periphery of the electrode spacer. Spacers formed may include a screen.

In some nonlimiting embodiments, electrodes may be positioned so that a gap exists between the surface of the electrode and the ion-permeable membrane or the endblock. The gap or spacing between the electrode, a flat plate, a mesh or a perforated plate electrode, may be created by inserting a spacer or any other type of structure shaped and sized to displace or set the electrode a distance from the ion-permeable membrane, the endblock or both. In one embodiment, the spacer is a structure that displaces the electrode at a predetermined position relative to the ion-permeable membrane, the endblock or both. In yet another embodiment, the spacer may attach the electrode to a supporting structure so that the distance between electrode may be varied. For example, a spacer may be a screen, a woven mesh or fabric or may be any structure shaped to dispose or position the electrode. In another embodiment, the spacer is a structure that permits or promotes fluid flow in a vertical, horizontal, perpendicular, or preferably, random direction in the fluid region immediately adjacent the electrode. The spacer may contact a surface or at least a portion of the surface of the electrode and may be shaped to dispose the electrode while, preferably, channeling or promoting the mixing of fluid adjacent the electrode. Thus, in another embodiment, a spacer may be a flow mixer that promotes removal or rejection of any gas or trapped bubbles by, for example, fluid redirection.

In accordance with one or more embodiments, a spacer or separator between ion selective membranes generally assures equal distribution of dilute and concentrate solutions within diluting and concentrating compartments respectively, assures uniform velocities in each diluting space and in each concentrating space, limits leakage of solutions to the outside of the stack and limits cross-leak between the dilute and concentrating solutions. Generally, conventional compartments use a spacer between ion-selective membranes. These spacers typically allow fluid flow through the device, support the ion-selective membranes, and promote a desired flow pattern or flow profile. In some embodiments, turbulence may be desirable.

Depleting and concentrating compartments may be bounded by ion-selective membranes having specific affinities so as to characterize the nature of a compartment. A depleting compartment structure may comprise a first ion permeable membrane, a spacer, and a second ion permeable membrane. A concentrating compartment structure may comprise a first ion permeable membrane, a spacer, and a second ion permeable membrane. In some embodiments, the spacers may be made of a rigid, inert material. The ion permeable membranes may be sealed to the periphery of a respective spacer on opposite surfaces of the spacer. Liquid to be purified within a stage may be passed through at least one compartment comprising spacers and membranes. The units which comprise spacers and membranes are repeated, usually between 5 and 250 times, in order to provide a reasonable liquid flow-through capacity.

These repeated compartments, or repeated cell pairs, may be bounded by endblocks supporting an electrode and electrode spacers. An electrode spacer may be positioned adjacent the endblock housing an electrode. An end plate may be positioned adjacent to the endblock electrode assembly on the side opposite that is adjacent to the electrode spacer. The full assembly may be held together in various manners. In some nonlimiting embodiments, tie-bars may extend along the entire length of the apparatus to retain the apparatus elements in place.

In accordance with one or more embodiments, a spacer between adjacent ion-selective membranes defining a compartment may include a screen to provide a fluid flow path.

The screen may be made of any material and of any configuration but should generally facilitate desired fluid flow. The screen component may generally be surrounded by a frame or gasket component. Thus, in some embodiments, a spacer may include a screen and a frame. The spacer including screen and frame may be of continuous or unitary construction. In some embodiments, the spacer may be constructed with various techniques including molding and extrusion. In at least one embodiment, the screen may be cut to fit within the frame. In other embodiments, a screen may be embedded within a frame. A spacer may be made from any inert material, for example, any plastic or polymeric material suitable for use in the apparatus, for example, a polyester or polypropylene woven mesh or fabric. In some embodiments, the spacer may generally be lightweight, durable and rigid. In some nonlimiting embodiments, the spacer may have an overall thickness of less than about 0.1 inch, less than 0.01 inch, or even less than 0.005 inch. In some embodiments, the thickness of the spacer may not be uniform across the spacer as discussed herein. In at least one embodiment, the thickest part of the spacer may be defined by a thickness of the frame.

In some embodiments, a spacer may help or improve the mixing or flow distribution of fluid in a compartment or in a region near or around an electrode. For example, the spacer may be a flow mixer that mixes, promotes or creates cross-flow of surrounding fluid. The cross-flow, in one embodiment, may be created by the nature of the weave of the screen, mesh or netting. Accordingly, the screen or flow mixer may have any pattern that promotes a desired fluid flow in the region adjacent to the electrode. In some embodiments, a screen may be made of an inert material or an extruded plastic, for example, polyethylene, polypropylene, polytetrafluorethylene, having a pattern including, for example, a square, box, weave or diamond pattern. A separator between ion selective membranes of an electrochemical stack may include a frame, for example of polyethylene, ethylene vinyl acetate copolymer, ethylene-ethyl acrylate or ethylene-acrylic acid copolymer, and a non-woven or expanded screen in the space enclosed by the frame. In at least some embodiments, the frame may be elastomeric. In some embodiments, the screen may be generally of the same thickness as the frame. In other embodiments, the screen may be thinner than the frame as discussed below. The literature discloses many designs of screen type spacers and many methods of making them, including molding and extrusion.

In some embodiments, the dimensions of the ED device or of individual cells therein may influence one or more design parameters. It may be desirable to assure that the flow of solution through the screen type spacers is uniform. At the same time it may be necessary to avoid cross-leaks between concentrating and diluting compartments and to avoid by-passing of the applied direct current down the internal manifolds, particularly the concentrate solution manifold.

In accordance with one or more embodiments, spacers may be applied between ion selective membranes in an electrochemical separation device, such as an ED, RED or EDR stack. The fabrics or screens of the spacer may support the ion selective membranes and promote mixing within compartments. The limiting current density may increase with the promoted mixing, which is helpful to ensure that the applied current density does not exceed the limiting current density. The screens may decrease the effective membrane area available for filtration due to blocking. Blockage of membrane surface area may generally be referred to as a shadow effect. Some experimental data has attributed a decrease in the effective membrane area by about 30% to this shadow effect. The screens may also decrease the effective compartment volume due to volume occupied by the screens. The decreased effective membrane area due to shadow effect in combination with the decreased effective compartment volume may increase the membrane electric resistance and compartment electric resistance. This may increase the total energy consumption in the stack. Thus screens, while required for the reasons noted above, have been associated with increased energy consumption.

In accordance with one or more embodiments, an electrochemical separation device may be configured for lower energy consumption. In some embodiments, a reduction in energy consumption of at least 10% may be achieved. In at least one embodiment, a reduction in energy consumption of up to about 15% may be achieved. For example, energy consumption associated with desalination of water from 35,000 ppm to 2800 ppm may be reduced up to about 15% using substantially the same ED device operated under substantially the same conditions but with using spacer configurations or techniques discussed herein. In some embodiments, the applied current density in, for example, a seawater desalination operation may already be relatively low, and a spacer configuration in accordance with one or more embodiments may further reduce energy consumption. In some embodiments, configurations or techniques may minimize the shadow effect on at least one ion-selective membrane in an ED device. Manufacturing costs due to the characteristics of employed spacers may also be reduced in accordance with one or more embodiments.

In accordance with one or more embodiments, shadow effect may be at least partially reduced and overall energy consumption may be at least partially decreased in an electrochemical separation device. In some embodiments, structural and/or operational parameters may facilitate reduction of energy consumption. In some embodiments, a characteristic of one or more spacers positioned between ion selective membranes may be associated with reduced energy consumption. In at least one embodiment, proximity of a screen of a spacer to an ion-selective membrane may be manipulated to impact energy consumption. In some embodiments, distance may be provided between a screen and an ion selective membrane. In some embodiments, at least a portion of the screen may not be in contact with the ion selective membrane. Thus, the screen may be at least partially spaced from the ion selective membrane. The screen may be spaced from the ion selective over part or all of its surface area. In at least one embodiment, the screen may be fully distanced from the ion selective membrane such that there is no contact between the screen and the ion selective membrane. Such distance may be provided structurally or operationally.

In accordance with one or more embodiments, relative construction of a screen portion and a surrounding frame portion of a spacer between ion-selective membranes may be manipulated to reduce the shadow effect and overall energy consumption. In conventional spacers used between ion selective membranes in electrochemical separation devices, a screen may be of substantially the same thickness or height as a surrounding frame. The spacer is therefore of substantially uniform thickness or height. Thus, when the spacer is layered or sandwiched between adjacent ion-exchange membranes, at least one surface of the screen of the spacer may be of substantially even height with a surface of the surrounding frame such that both the frame and screen of the spacer are in substantial contact with the adjacent ion-selective membranes. In at least some embodiments discussed herein, a relatively thin screen may be used in a spacer. In some embodiments, a thin and open screen may be used in one or more compartments. In certain embodiments, the screen may generally be configured so that it is relatively thinner than a surrounding frame or gasket of the spacer as illustrated in FIG. 1. Thus, a spacer may not be of substantial uniform thickness or height. Instead, the screen may be thinner or lower in height relative to a surrounding frame or gasket of the spacer. Thus, at least one surface of the screen of the spacer may not of even height with a surface of the surrounding frame. Thus, when such a spacer having a thin screen is layered or sandwiched between adjacent ion-exchange membranes, the screen of the spacer may not be in full, partial or substantial contact with the adjacent ion-selective membranes.

Figure 2:
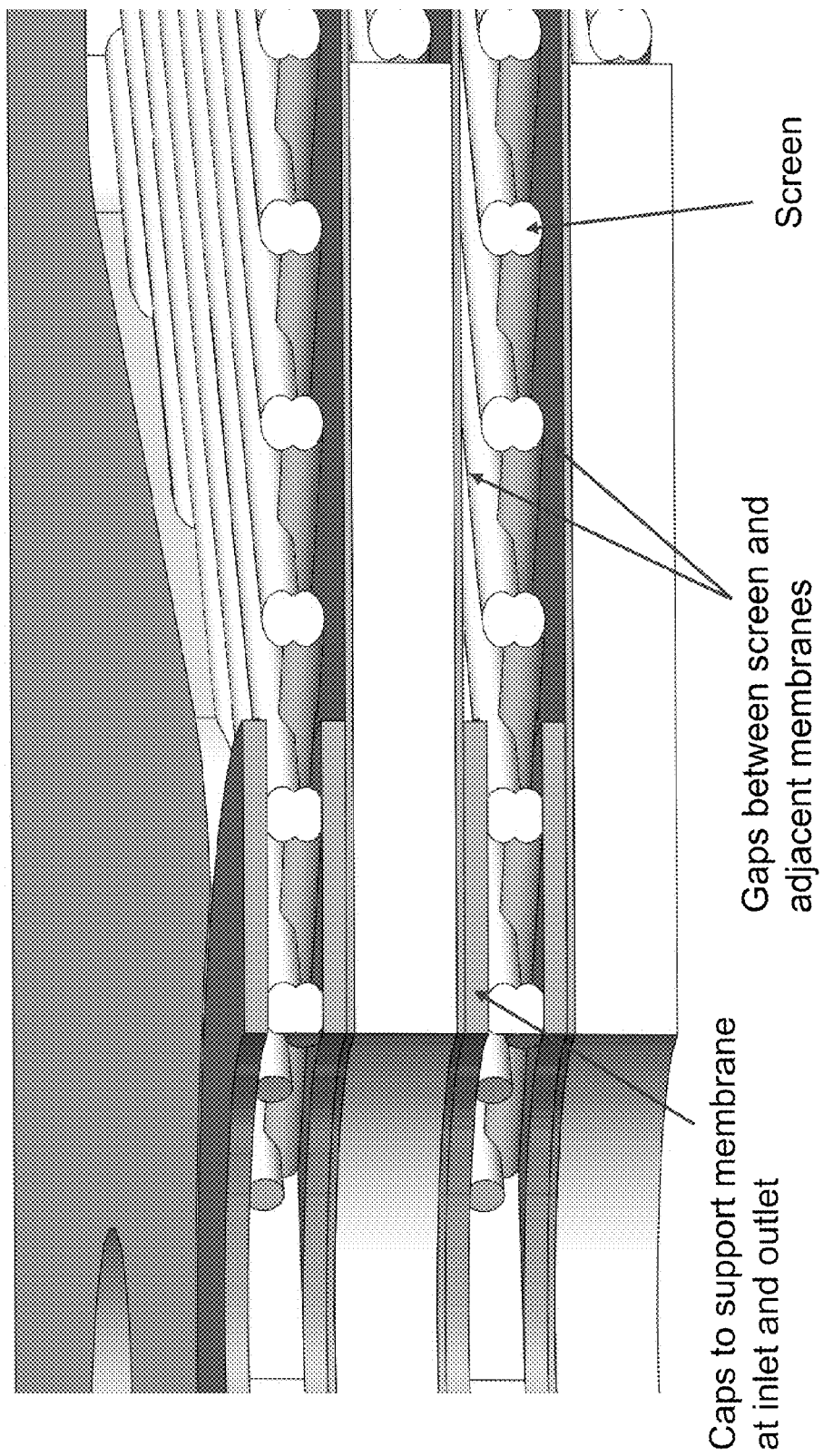
FIG. 2 presents a schematic drawing of an electrochemical separation cell stack in accordance with one or more embodiments.

In accordance with one or more embodiments, a gap may exist between the screen of the spacer and an adjacent ion selective membrane as illustrated in FIG. 2. A first gap may exist between a first side of the screen and a first ion-selective membrane, and a second gap may exist between a second side of the screen and a second ion-selective membrane. The gaps may provide distance or space between the screen and the ion-selective membranes to reduce the shadow effect and to decrease overall energy consumption of the electrochemical device. The first and second gaps may generally be of the same width in some embodiments. In other embodiments, the first and second gaps may of different widths. A thinner screen may increase the effective membrane area and increase the effective compartment volume, thus decreasing the membrane electric resistance and compartment electric resistance. This may result in an overall reduction in energy consumption.

In accordance with one or more embodiments, an electrochemical device may include a first compartment defined by first and second ion-selective membranes. A spacer may be positioned between the first and second ion-selective membranes. Thus, the spacer may be within the first chamber. The spacer may include a screen and a surrounding frame. The screen may be thinner than the surrounding frame. A first gap may therefore exist between a first side of the screen and the first ion-selective membrane. A second gap may exist between a second side of the screen and the second ion-selective membrane. A plurality of such compartments may define the electrochemical device. In at least one embodiment, spacers including thin screens may be used in one or more dilute compartments of the device. In still other embodiments, thin screens may be used in spacers in one or more concentrating compartments of the device.

In some embodiments, caps may be inserted to support a membrane where the gaps exist. In at least some embodiments, gaps as discussed further herein may be inserted, such as at inlet and outlet of a compartment. In such embodiments, a thickness of a cap may be substantially equal to the width of a corresponding gap. In at least one embodiment, a width of a compartment may be substantially equal to the combined thickness of a screen and gaps, or to the combined thickness of a screen and caps to ensure membrane support.

The construction of the spacer may influence the proximity of a screen to one or more ion-selective membranes. The construction of the spacer may therefore impact the positioning of the screen within a compartment bounded by adjacent ion-selective membranes. In some embodiments, the relative thickness of a screen portion of a spacer relative to a thickness of a surrounding frame portion may dictate the proximity of the screen portion to one or more ion-selective membranes in an electrochemical separation stack. In at least some embodiments, the construction of the spacer may be such that the screen is positioned substantially towards the center of a compartment. In at least one embodiment, the screen may occupy a relatively central fraction of a compartment. Such an arrangement may minimize the shadow effect on the ion-selective membranes caused by the screen. In other embodiments, the screen may be positioned in closer proximity to a first ion-selective membrane relative to a second ion-selective membrane. In at least some embodiments, a screen may be referred to as "floating" when the screen is not in contact with the entire surface of an adjacent ion-selective membrane and therefore has a reduced shadow effect on the membrane. The screen may still be attached to the spacer frame but may be described as floating with respect to adjacent ion-selective membranes for shadow effect reduction. In at least some embodiments, shadow effect may be reduced by preventing a screen spacer from blocking effective membrane area. In some embodiments, this may be accomplished by spacing the screen from adjacent ion-selective membranes so that a greater amount of membrane area is available for filtration.

Figure 3:
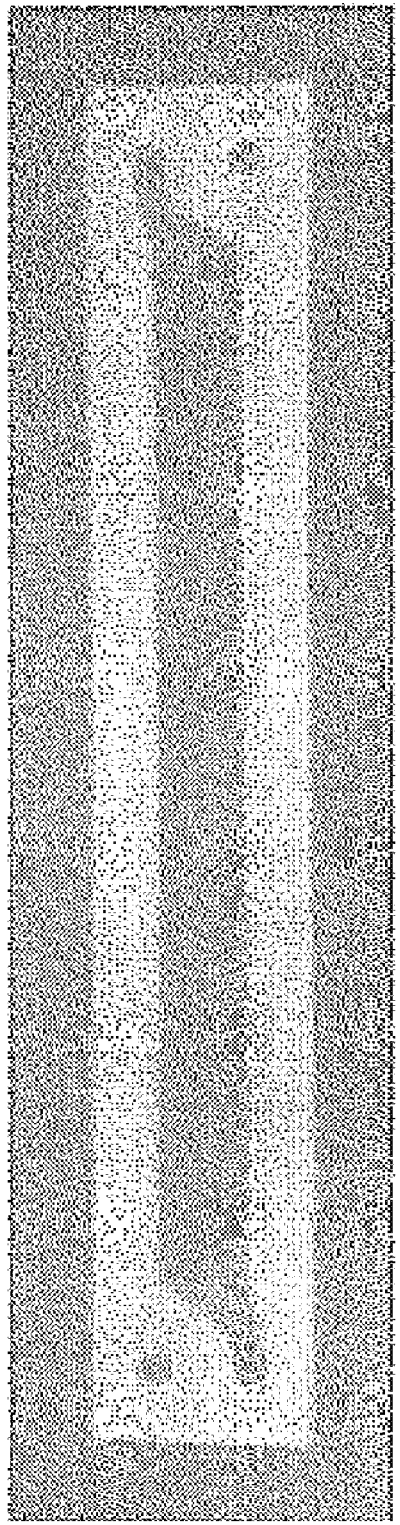
FIG. 3 presents a schematic drawing of a hollow spacer in accordance with one or more embodiments.

In accordance with one or more embodiments, reduction of shadow effect may be accomplished in other ways that may allow the screen to function for fluid flow while eliminating contact with adjacent ion-selective membranes. Different techniques may be appropriate depending on the application and related circumstances. Design modifications to the spacer for shadow effect reduction should still generally ensure rigid and durable construction, along with reproducibility. In some embodiments, substantially hollow spacers as illustrated in FIG. 3 may be applied in ED stacks to reduce energy consumption and pressure drop during operation. In some embodiments, a screen may be used only at inlet and outlet channels of a spacer with the remainder of the spacer being substantially void of a screen. In these embodiments, a spacer may have no screen in the flow channel. Any desired percentage of the spacer may be hollow with respect to the screen positioning depending on the intended characteristics of the spacer. In some embodiments, screen in the inlet and outlet areas may prevent internal leakage between adjacent compartments. Hollow spacers may help minimize the shadow effect of the screen and the volume occupied by the screen which may both reduce the voltage drop across the stack. In at least one embodiment, hollow spacers may be applied to dilute compartments and conventional spacers may be applied in concentrated compartments. Thus, a screen may be positioned at the inlet and/or outlet channels but not in the rest of the spacer. In other embodiments, thinner screens may be used at the inlet and outlet channels of a spacer with relatively thicker screens associated with the remainder of the spacer. Such embodiments may also reduce shadow effect and overall energy consumption.

To achieve low energy consumption in certain applications, such as in seawater desalination, the screen of a spacer should generally be as thin as possible. Pressure drop through the screen and risk of plugging and fouling, however, increase as the diameter of filaments in the screen and the size of openings for flow passage through the screen decrease. In some embodiments, the screen may be thinner than the overall spacer thickness. In at least some embodiments, the screen may be thinner than a surrounding frame or gasket. In certain nonlimiting embodiments, the screen may be about 0.002 inch to about 0.02 inch thinner than the overall spacer or frame thereof. In at least some nonlimiting embodiments, a preferable range of screen thickness may be between about 0.0075" (0.19 mm) and about 0.012" (0.30 mm). In such nonlimiting embodiments, the thickness of the frame of the spacer surrounding the screen may be in a range of about 0.010" (0.25 mm) to about 0.015" (0.38 mm). The thickness may be higher for other applications where energy consumption is not as high a priority and plugging and fouling are of concern. In certain nonlimiting embodiments, an overall spacer thickness equal to the thickness of the frame may be as high as about 0.060" (1.52 mm) or higher depending on the application. In such nonlimiting embodiments, the screen would then be preferably about 0.005" (0.13 mm) to about 0.01" (0.25 mm) thinner than the frame.

In accordance with one or more embodiments, spacers for positioning between adjacent ion-selective membranes may be constructed in various known ways. In some embodiments, a screen portion may be secured or embedded within a frame portion in accordance with various known techniques. The construction may result in a screen portion having a thinner width relative to a surrounding frame portion. The width of the thinner screen may be centered in the construction relative to the width of the thicker frame portion, or may alternatively be offset in one direction or another. In accordance with one or more embodiments, the spacer screens for ED applications may typically be of woven or extruded construction. Commonly used materials include polyethylene, polypropylene, polyester and nylon. Other materials may be used in applications where higher chemical resistance is required, such as PVDF.

In accordance with certain embodiments, one or more operational parameters of an electrochemical separation device may be manipulated to reduce the shadow effect and reduce overall energy consumption. In some embodiments, distancing of a screen away from adjacent ion-selective membranes may be promoted. In some embodiments, membrane movement may be promoted so as to create gaps between screen surfaces and adjacent ion-selective membranes. In at least one embodiment, a mild pressure may be applied on one or more compartments of an electrochemical separation stack during operation. Such pressurization may be induced by various techniques but should generally avoid distortion and other undesirable effects. In some nonlimiting embodiments, less than about 25 psi of pressure may be applied. In at least some nonlimiting embodiments, less than about 20 psi of pressure may be applied. In certain nonlimiting embodiments, about 5 psi to about 10 psi may be applied. In some embodiments, pressurization may be applied via adjustment of a process fluid flow rate fed to one or more compartments of the device, via adjustment of one or more outlet valves to achieve back pressure, or via application of an outside source, such as air. In at least one embodiment, flow rate to a dilute compartment may be adjusted. In at least one other embodiment, back pressure may be applied in one or more compartments. In some nonlimiting embodiments, back pressure may be applied to one or more dilute compartments. The compartment pressurization may generally push a membrane away from a screen thus reducing the shadow effect on the membranes. Such pressure manipulation techniques may be used alone or in conjunction with one or more structural configurations discussed above.

To prevent or at least inhibit leakage of ions and/or liquid from the depleting compartment to the concentrating compartment and vice versa, the ion selective membrane sandwiched between depleting compartment and concentrating compartment spacers may form a substantially water-tight seal. Typically, the spacers and the ion selective membranes are compressed together and fixed in position, for example, with nuts and tie bars. In one embodiment, a depleting compartment, positioned between concentrating compartments, can be defined, at least in part, by the cavity formed between a depleting compartment spacer and ion-selective membranes. Similarly, a concentrating compartment may be a cavity that may be defined, at least in part, between a concentrating compartment spacer and by selective membranes. Water-tight seals can be used to prevent leakage from and between a depleting compartment and a concentrating compartment. Seals positioned between the depleting compartment and concentrating compartment spacers, may comprise a resilient sealing member disposed within a groove formed on a surface of the depleting compartment spacer. In another embodiment, a compartment spacer having a groove formed on one side of the spacer may be used. For example, the groove may be disposed around a perimeter of a depleting compartment or concentrating compartment. Resilient sealing members may be dimensionally constructed and arranged to at least partially fit (and may be compressed in some cases) within the groove formed on the surface of the spacer when the electrochemical device is assembled. A plurality of seals, such as a primary seal and a secondary seal may also be used. Port seals may form a water-tight seal, around fluid ports, and/or between adjacent spacers. Port seals may typically comprise a resilient sealing member. The port seal, in some cases, may be compressed within a groove surrounding a fluid connection port. Thus, as assembled, the resilient sealing member may prevent or at least inhibit leaks to and from the fluid port.

In accordance with one or more embodiments, implementing a thinner screen in a spacer may result in mechanical cross-leak, for example, at ports. Cross leakage may worsen with scale-up to devices of various desired dimensions. In some embodiments, the thickness of the spacer in the port areas may be varied to address cross-leaks. Around each inlet or outlet port, membranes may be pressed against adjacent spacers by compressive force transmitted through the screens. The membranes should have sufficient mechanical rigidity to span the gaps so that they can be sealed fully against the gasket material in the adjacent spacers. Sealing membranes at port areas may be more challenging if membrane thickness is reduced to lower electrical resistance. Membranes with a resistance of less that about 1.5 ohms-cm$^2$ typically have a thickness of 50 μm or less, for example, which could result in less rigidity and more deflection under mechanical pressure.

In accordance with one or more embodiments, even thin flexible membranes may accommodate spacers having screens that are thinner than the surrounding gasket. The spacers may have recessed areas around ports. Hollow disk shaped caps may be placed in recessed areas to support the membranes and transmit the compressive force in a stack so that the membranes are pressed against adjacent spacers as illustrated in FIG. 2. The thickness of the cap may be greater than the depth of the recess on the spacer so that the cap also occupies the recess in the adjacent spacer. The caps in the recesses in a spacer may be partially supported by the gasket material and partially be the screen in the inlet or outlet channel that directs the fluid from the port into the flow compartment. The membranes may be forced into the recesses in adjacent spacers and compressed against the gasket material in those spacers by the caps. Thicker caps that can span the gaps in the screen may be used by borrowing space for the caps from adjacent spacers.

In accordance with one or more embodiments, the caps should generally have tight tolerance on thickness. Potential materials for caps include plastic shim stock manufactured from polyester or polycarbonate. Thickness tolerance for a polyester shim up to 0.005 inch (0.127 mm) thick, for example, can be less than +/−0.0002 inch (0.005 mm). Another potential material is fiberglass reinforced epoxy laminate with a thickness tolerance of +/−0.0005 inch (0.013 mm). In some embodiments, the surfaces of the recessed areas may be smooth with the seal between the membranes and the recessed surfaces in the spacers being flat gasket seals.

In other embodiments, the recessed surfaces may have seal beads which may improve the seal between the membranes and the adjacent spacers, particularly if the recessed surfaces are not smooth due to manufacturing limitations.

In accordance with one or more embodiments, prevention of product fluid wastage and reduction of current leakage may be accomplished by introducing a cap and recess on the spacer at regions where membranes are not properly supported by spacer gaskets. A recess may be created on a spacer, and a cap may be inserted into the recess, at select locations to act as a support for the membrane at the screen region to prevent fluid exchange between dilute and concentrate streams in an ED module when the pressure difference between the two cells increases. Recesses may be created on each spacer at selected locations where ports are directly connected to the screen. Precautions may be taken during spacer manufacture to ensure that the recess thickness is the same as the screen thickness. In addition to the recess, caps with carefully selected dimensions may be inserted into some or all recesses to support the membrane. A thicker cap may enhance sealing between spacer and membrane at the port adjacent to the recess created. An equation may be used to estimate the cap thickness:

$$T_{cap} > (t_{spacer,max} - t_{recess,min})/2$$

Figure 4:
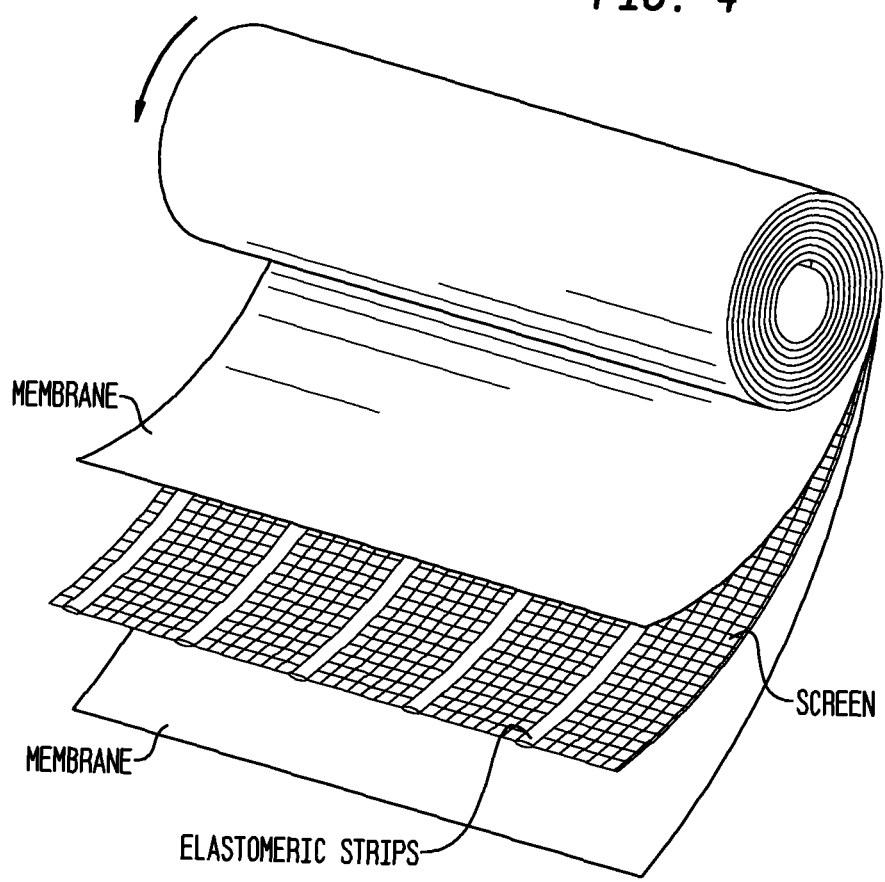
FIG. 4 presents a schematic illustrating construction of a spiral wound electrodialysis cell in accordance with one or more embodiments.

In accordance with one or more embodiments, ED devices of various capacities and geometries may be used. In some embodiments, a plate and frame ED device may be used. In other embodiments, a cross-flow ED device may be used. In still other devices, a spiral wound ED device may be assembled with floating screens. In a spiral wound ED device, one or more cell pairs or leaves are wound around a central core, which usually contains the anode. The ends of the spiral may be sealed by potting with an adhesive after winding or an adhesive can be applied to the edges of the membranes and screen as the components are wound. In some embodiments, various methods may be used to ensure "floating" screens in the dilute and concentrate compartments. In some embodiments, the cell pairs may be loosely wound and then potted at the ends so that the edges of the cell pairs are sealed with adhesive and the screen is floating between the membranes. Relative tightness or looseness of the winding may not be easy to control or quantify. In other embodiments, the screens may be impregnated with strips of elastomeric material thicker than the screens as illustrated in FIG. 4. The strips may function as ribs which create channels between the membranes and help ensure uniform flow distribution. Adhesives may be applied outside of the outer strips to seal the device either by potting after winding or by application during winding. At the inlets to the dilute and concentrate compartments, thin strips of a suitable material may be inserted between the membranes and the screens to ensure that the screens are not in contact with the membranes downstream of the inlet areas. Combinations of these methods may be used to ensure that there is a gap between the screens and the adjacent membranes.

In accordance with one or more embodiments, omission or misplacement of caps in an ED module may be prevented to improve the quality of resulting modules and to reduce the production cost in modules using caps to prevent mechanical cross-leak. In conventional devices, six pieces of cap may be inserted into every piece of spacer installed. In some embodiments, the caps may be tacked onto each spacer prior to module assembly, such as during production of the spacer by the operator with no additional cost. In at least one embodiment, wait time associated with a thermal press used to thermally laminate rubber and screen to form a spacer may be used by an operator to tack caps onto the spacer, such as with low viscosity glue. As such, focus may be placed on other crucial-to-quality activities during module assembly instead of ensuring proper cap installation and overall module assembly cycle time may be reduced.

In accordance with one or more embodiments, an aqueous solution to be processed may be introduced into an electrochemical treatment device from a source or point of entry. A conduit may serve as a manifold fluidly connecting a process stream source to one or more compartments of one or more electrochemical treatment devices. The source of process fluid may typically be fluidly connected to at least one compartment of the electrochemical device. In some embodiments, process water may be introduced to a first compartment and a second compartment of the electrochemical separation device.

As used herein, "purify" relates to reducing the total dissolved solids content and optionally to reducing the concentration of suspended solids, colloidal content and ionized and non-ionized impurities in a source water to a level where the purified water has been rendered potable and can be used for fresh water purposes such as, but not limited to, human and animal consumption, irrigation, and industrial applications. Desalination is a type of purification in which salt is removed from seawater. One or more embodiments may pertain to desalination of seawater. The feed water or water to be treated may be from a variety of sources including those having a TDS content of between about 3,000 ppm and about 40,000 ppm, or more. Feed water can be, for example, seawater from the ocean, brackish water, gray water, industrial effluent, and oil fill recovery water. The feed water may contain high levels of monovalent salts, divalent and multivalent salts, and organic species. In some embodiments, notable aspects may involve methods of treating or desalinating a process water or a feed water consisting of or consisting essentially of seawater. The water may be processed to a desired or required level of purity.

Purified water may be sent for use or storage as potable water. Potable water may be preserved or further disinfected, if desired, and may find use in various applications including agriculture and industry, such as for semiconductor fabrication. A reject or concentrate stream produced by the electrochemical device may be collected and discharged to waste, recycled through the system, or fed to a downstream unit operation for further treatment. Product streams may be further processed prior to downstream use, upstream use, or disposal. For example, a pH level of a product acid or product base stream may be adjusted. In some embodiments, it may be desirable to mix, in part or in whole, one or more product streams. One or more additional unit operations may be fluidly connected downstream of the electrochemical unit. For example, one or more unit operations may be configured to receive and process a target product stream, such as before delivering it to a point of use. Polishing units, such as those involving chemical or biological treatment, may also be present to treat a product or effluent stream of the device prior to use or discharge.

In accordance with one or more embodiments, one or more sensors may be positioned to detect one or more characteristics, conditions, properties or states of any stream, component or subsystem generally associated with the device. In some non-limiting embodiments, one or more of the sensors may be configured to detect a concentration of a target species in a stream entering or exiting the device. In one embodiment, one or more sensors may be positioned to detect a concentration at an inlet and/or an outlet of one or more compartments of the device. In another non-limiting embodiment, one or more sensors may be positioned to detect a pH level at an inlet and/or an outlet of one or more compartments of the device. In still other embodiments, a pressure sensor may be associated with one or more compartments of the device.

In some embodiments, devices and methods involve a controller for adjusting or regulating at least one operating parameter of the device or a component of the system, such as, but not limited to, actuating valves and pumps, as well as adjusting a property or characteristic of a current or an applied electric field through the electrically driven separation device. The controller may be in electronic communication with at least one sensor configured to detect at least one operational parameter of the system. The controller may be generally configured to generate a control signal to adjust one or more operational parameters in response to a signal generated by a sensor. For example, the controller can be configured to receive a representation of a condition, property, or state of any stream, component or subsystem of the device, or from the device. The controller typically includes an algorithm that facilitates generation of at least one output signal which is typically based on one or more of any of the representation and a target or desired value such as a set point. In accordance with one or more particular aspects of the invention, the controller can be configured to receive a representation of any of a measured property of any stream from the device, and generate a control, drive or output signal to any of the treatment system components, including the device, to reduce any deviation of the measured property from a target value.

In accordance with one or more embodiments, a controller may be configured to reverse polarity of an electric current applied through the device. The controller may be in communication with one or more sensors configured to provide a measurement signal which is representative of a concentration of a target species in a stream associated with the device, for example, a product stream exiting a compartment of the device. In some embodiments, a pH level, pressure or concentration measurement may be detected by a sensor and communicated to the controller. The controller may be configured to generate a control signal in response a received measurement being above or exceeding a predetermined level. The control signal may reverse polarity of an electric current applied through the device so as to regenerate a membrane or media in a compartment therein. In some embodiments, the control signal may be sent to a power supply associated with the device based at least partially on the measurement signal.

In other configurations, the controller can be in open-loop control, providing or changing one or more operating conditions of at least one component of the treatment system. For example, the controller can periodically generate output or drive signals, typically according to a predefined schedule, that reverses the polarity of the applied electric field, and preferably, the stream flow paths through the device, from a predetermined arrangement to a second predetermined arrangement. In some embodiments, the controller may send a control signal to apply a predetermined pressure level to one or more compartments to facilitate shadow effect reduction.

One or more sensors implementable in the systems and methods can provide a representation of a property or characteristic of a stream into, from, or within the device, or a property or characteristic of a current applied through the device. For example, the one or more sensors can be configured to measure and provide a representation, e.g., a measured signal, of a process condition such as the pH of any stream exiting any of the compartments. The one or more sensors can also provide measured conductivity or resistivity values of any of the streams into, from or within the device. In particularly advantageous configurations, at least one sensor can be utilized to provide a representation, by direct measurement or by proxy, of the concentration of at least one target species in the product stream from the device, or from any of the compartments. Measurement of concentration can be effected by, for example, techniques wherein samples are batch-wise periodically retrieved and analyzed, or analyzed semi-continually through one or more side streams.

The controller is typically a microprocessor-based device, such as a programmable logic controller (PLC) or a distributed control system, that receives or sends input and output signals to and from components of the device or system in which the device is operative. Communication networks may permit any sensor or signal-generating device to be located at a significant distance from the controller or an associated computer system, while still providing data therebetween. Such communication mechanisms may be effected by utilizing any suitable technique including but not limited to those utilizing wireless protocols.

In at least one embodiment, one or more bipolar membranes may be incorporated to at least partially define one or more compartments. Bipolar membranes are generally anionic membranes on one side and cationic on the other. Bipolar membranes may be generally efficient in splitting water. In some embodiments, bipolar membranes can be used in place of a water splitting cell. In some embodiments, one or more bipolar membranes may be used in conjunction with one or more anion and/or cation selective membranes. In accordance with one or more embodiments, an electrochemical device may include an alternating series of bipolar membranes and anion selective membranes. Likewise, an electrochemical device may include an alternating series of bipolar membranes and cation selective membranes in accordance with one or more embodiments. Those ordinarily skilled in the art would recognize that, in accordance with certain aspects, other types and/or arrangements of selective membranes can also be used. In at least one embodiment, an electrochemical device does not include a bipolar membrane.

In accordance with some embodiments, a plurality of stages in a treatment system can be utilized to purify water or at least reduce the concentration of dissolved solids therein. For example, water to be treated can be purified in stages such that each stage selectively removes one or more types of dissolved solids thereby producing purified, e.g., desalted or even potable, water. In some embodiments, multiple treatment stages may be present in a single electrochemical device. In other embodiments, various treatment stages may be present in a series of electrochemical devices. In some cases, one or more stages can comprise one or more unit operations that effects selective retention of a type of dissolved species, which can then be removed in one or more subsequent or downstream stages. Thus, in some embodiments of the purification system of the invention, a first stage can remove or at least reduce the concentration of one type of dissolved species. In other embodiments, the first stage can remove or reduce the concentration of all but one type of dissolved species. Any retained species, not removed from the water, can then be removed or the concentration thereof reduced in one or more subsequent stages.

In the device, an anode may be positioned at an opposite end of a stack of depleting and concentrating compartments from within which a cathode is positioned. Each anode and cathode may be provided with an electrode spacer and an ion selective membrane, wherein electrolyte can pass through the electrode spacer. The liquid, typically comprising water, to be purified can be passed in parallel through each depleting compartment, and a second liquid can be passed through each concentrating compartment in each stage, to effect removal of ions and/or ionic species from the first liquid in depleting compartment to the second liquid in the concentrating compartment. Examples of ions that may be dissolved in the water to be purified include sodium, chloride, potassium, magnesium, calcium, iron, etc. Electrolytes may be passed through the spacer adjacent each electrode in the device. Other possible flow arrangements are possible.

The liquid to be purified can contain various species, for example dissolved or suspended therein, such as ions and ionic species, organics, etc. The liquid to be purified may contain, for example, at least about 20 wt %, at least about 15 wt %, at least about 10 wt %, at least about 5 wt %, at least about 3 wt %, at least about 1 wt %, at least about 0.5 wt %, or at least about 0.1 wt % of one or more species contained therein. In other cases, the water or other liquid to be purified may contain a smaller percentage of species therein. In one embodiment, the liquid to be purified consists essentially of water (i.e., the water may include other ions, salts, suspension matter, etc., so long as those of ordinary skill in the art would consider the liquid to be essentially water, for example, the liquid may be tap water, filtered water, etc).

The electrochemical devices may be operated in any suitable fashion that achieves the desired product and/or effects the desired treatment. For example, the various embodiments can be operated continuously, or essentially continuously or continually, intermittently, periodically, or even upon demand. Multi-pass systems may also be employed wherein feed is typically passed through the device two or more times, or may be passed through an optional second device. An electrical separation device may be operatively associated with one or more other units, assemblies, and/or components. Ancillary components and/or subsystems may include pipes, pumps, tanks, sensors, control systems, as well as power supply and distribution subsystems that cooperatively allow operation of the system.

It should be understood that the systems, techniques and methods may be used in connection with a wide variety of systems where the processing of one or more liquids may be desired. Thus, the electrical separation device may be modified by those of ordinary skill in the art as needed for a particular process, without departing from the scope of the invention.

The function and advantages of these and other embodiments will be more fully understood from the following non-limiting example. The example is intended to be illustrative in nature and is not to be considered as limiting the scope of the embodiments discussed herein.

EXAMPLE

Experiments were performed to evaluate the impact of shadow effect in ED devices and to assess potential techniques for reduction of shadow effect.

Figure 5:
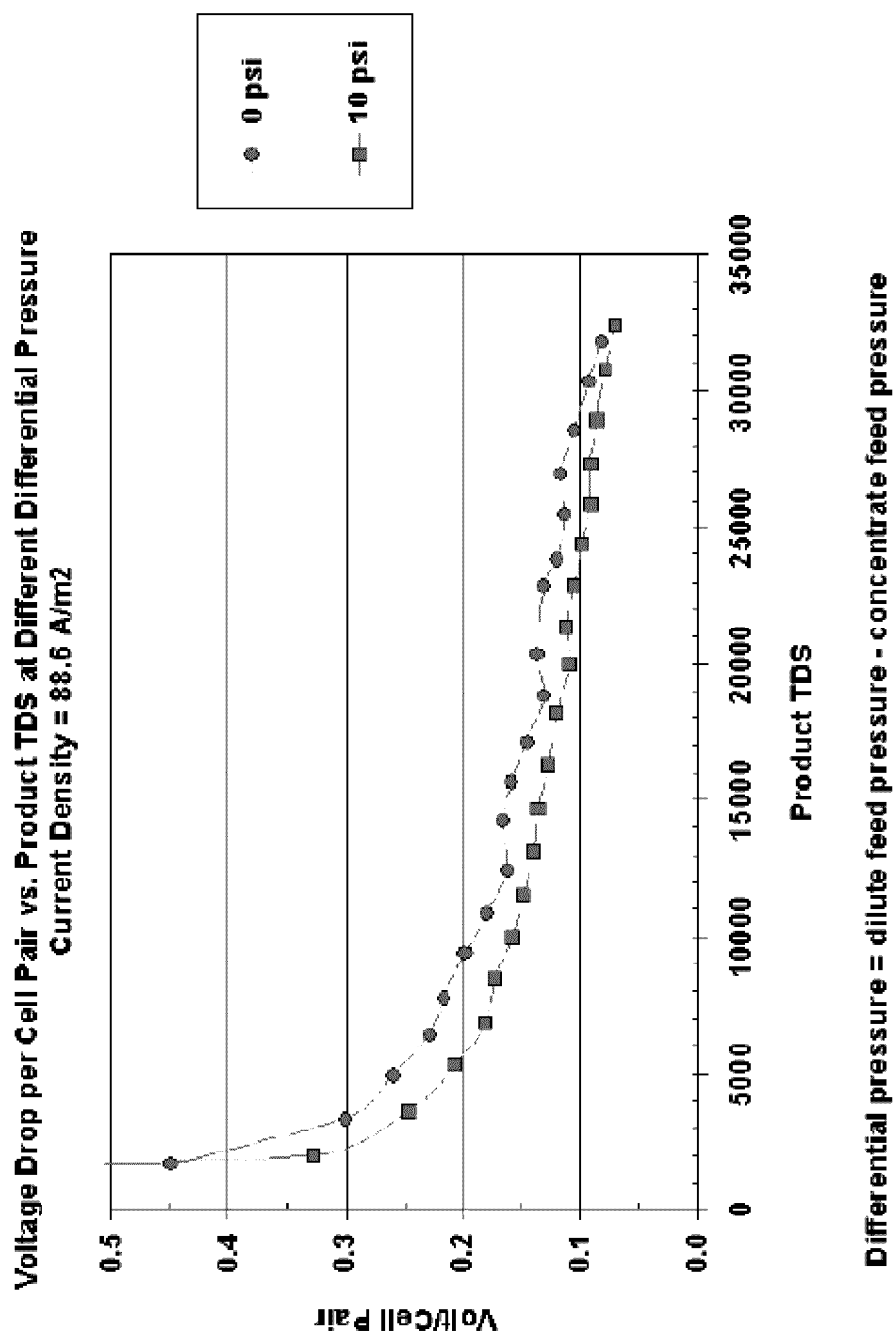
FIG. 5 presents data regarding voltage drop per cell pair versus product TDS at different differential pressures as discussed in the accompanying Example.

A first lab-scale ED module with flow channel size of 3.18 cm (width) by 35.56 cm (length) and a total of 32 cell pairs of ASTOM® CMX/AMX ion exchange membrane was operated. 35000 ppm NaCl solution was used as feed water. In the dilute compartment, the flow rate per cell pair was 20 ml/min, and in the concentrate compartment the flow rate per cell pair was 5.625 ml/min. The operation current density was 88.6 amp/m$^2$ and operation was at room temperature (approximately 25 C). The voltage drop was measured across the central 12 cell pairs. One experiment was operated at zero back pressure (0 psi) of the dilute outlet stream, and a second experiment was operated at 10 psi back pressure of the dilute outlet stream. FIG. 5 presents data of voltage per cell pair versus product TDS at 0 psi and 10 psi back pressure. Energy consumption with the pressurized dilute was lower than the energy consumption with the unpressurized dilute.

Figure 6:
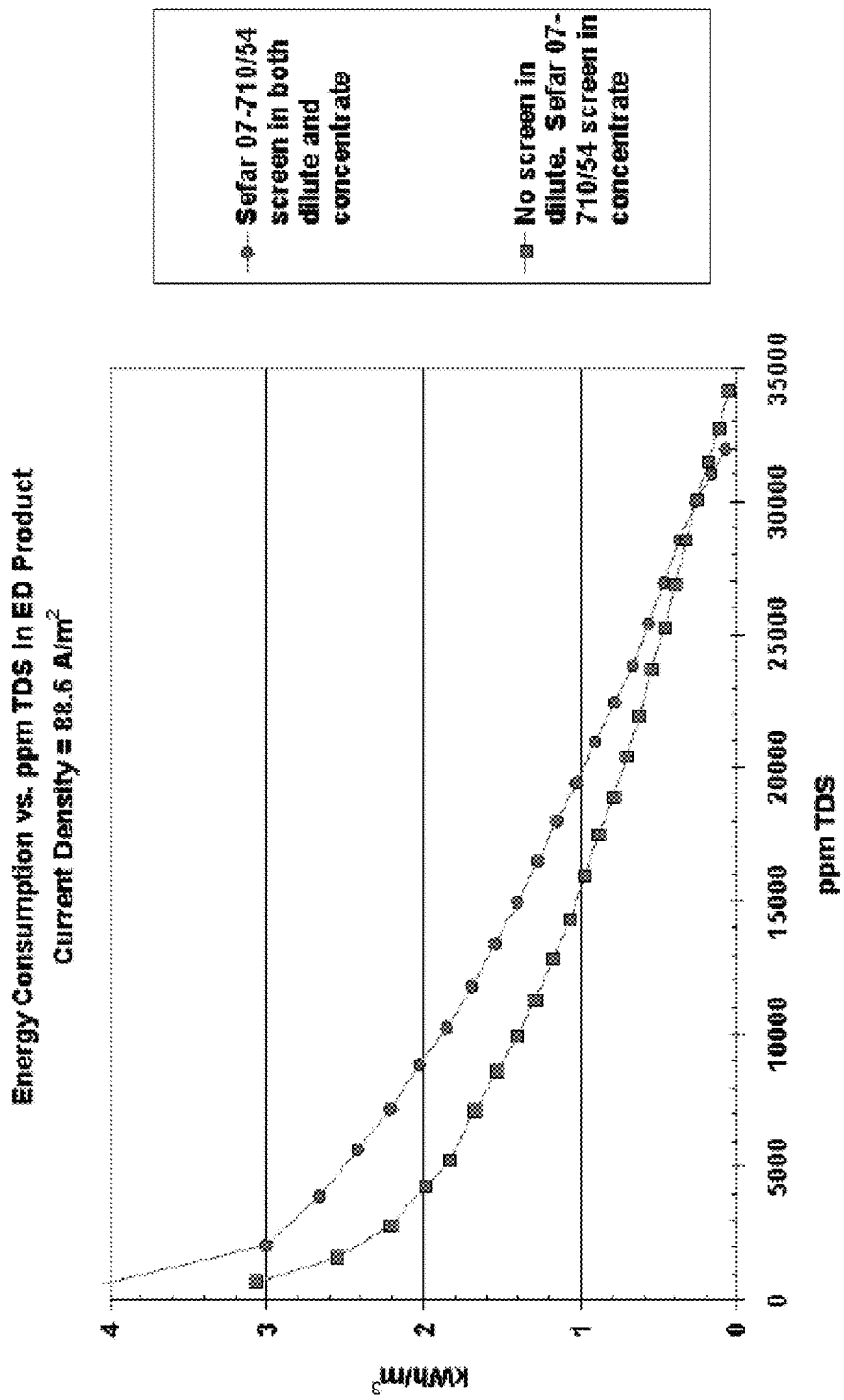
FIG. 6 presents data regarding energy consumption versus ppm TDS in electrodialysis product as discussed in the accompanying Example.
Figure 7:
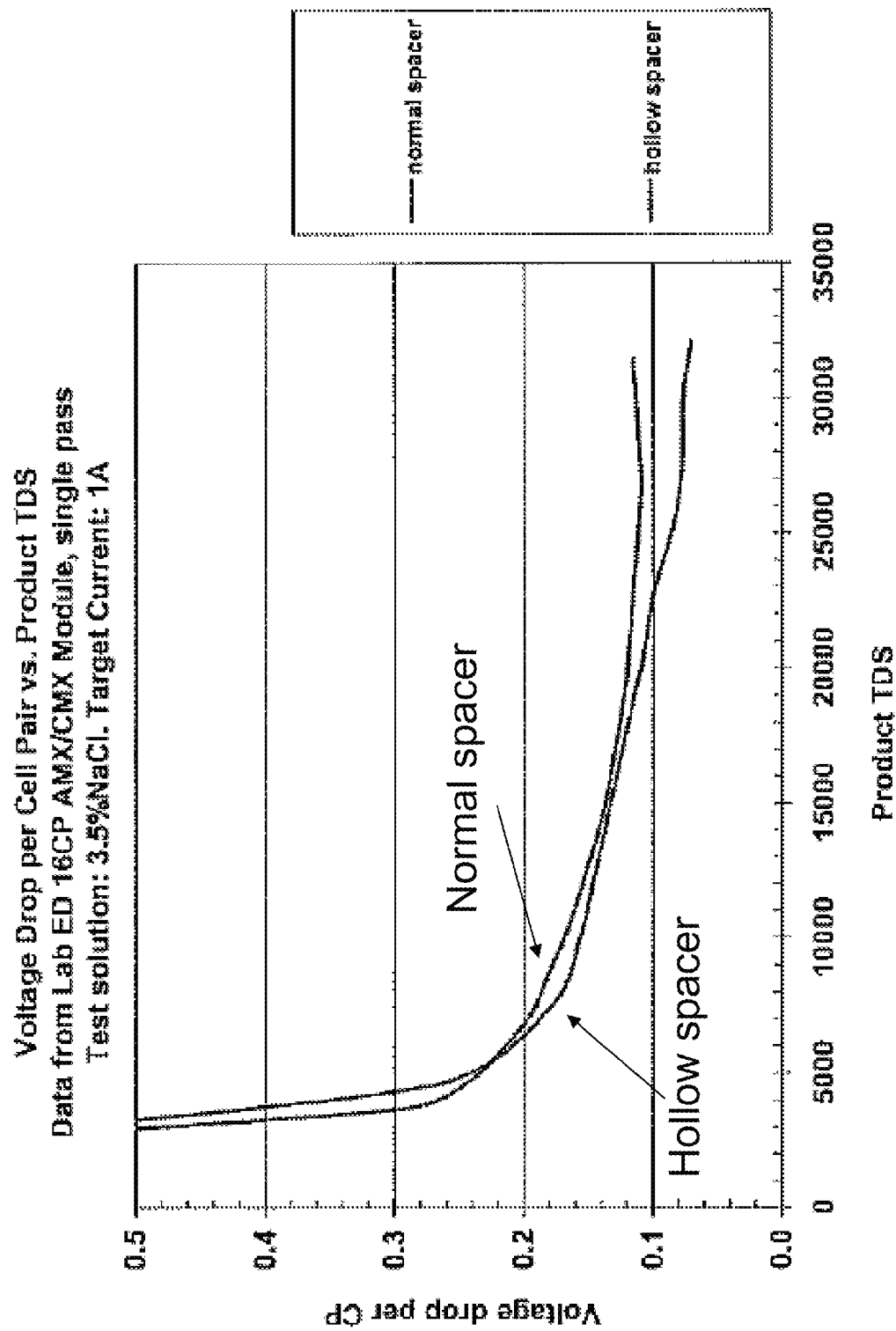
FIG. 7 presents data regarding voltage drop per cell pair versus product TDS for a normal spacer and a hollow spacer as discussed in the accompanying Example.
Figure 8:
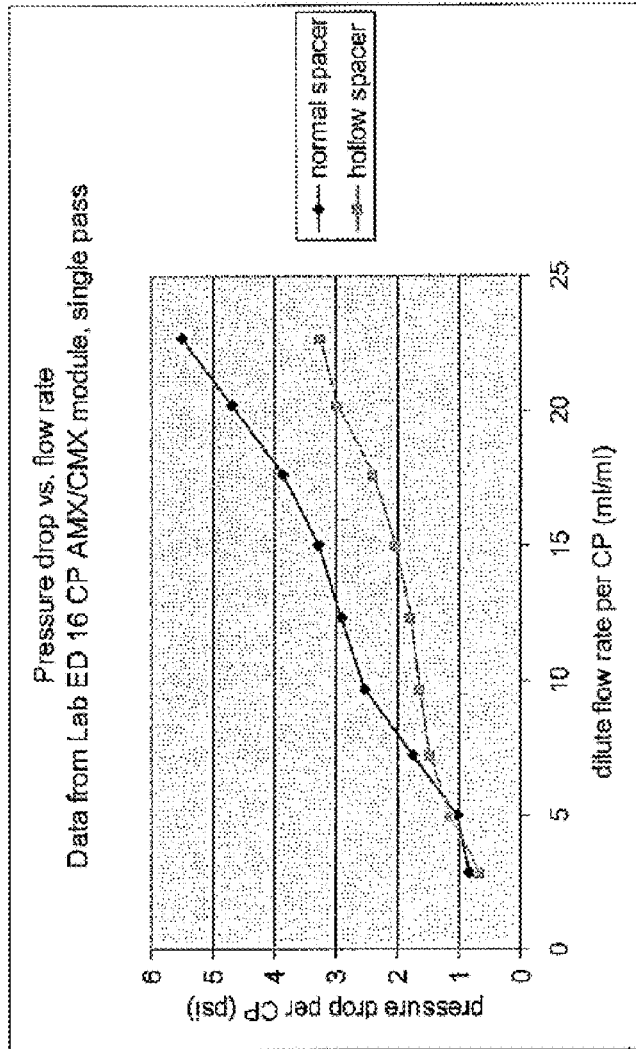
FIG. 8 presents data regarding pressure drop per flow pass versus flow rate as discussed in the accompanying Example.

A second lab-scale ED module with flow channel size of 3.18 cm (width) by 35.56 cm (length) and a total of 16 cell pairs of ASTOM® CMX/AMX ion exchange membrane was operated. 35000 ppm NaCl solution was used as feed water. In the dilute compartment, the flow rate per cell pair was 20 ml/min, and in the concentrate compartment the flow rate per cell pair was 5.625 ml/min. The operation current density was 88.6 amp/m$^2$ and operation was at room temperature (approximately 25 C). The voltage drop was measured across the central 10 cell pairs. One experiment included screen in both dilute and concentrating compartments. A second experiment included screen in only the concentrating compartments. FIG. 6 presents data of desalination energy versus product TDS with and without screen in the dilute compartment. Energy consumption was lower when screen was not present in the dilute compartment.

The data indicated that shadow effect did impact ED performance by increasing energy consumption. The data also indicated that pressurizing the dilute compartment can reduce shadow effect and thus reduce energy consumption.

Another experiment was performed to evaluate the use of hollow spacers for reduction of shadow effect. Two comparable ED experiments were run through a lab module. The first experiment used normal spacers in all compartments and the second used hollow spacers in dilute compartments and normal spacers in concentrated compartments. FIGS. 5 and 6 present the results in which it is noted that the voltage drop per cell pair was lower for the hollow spacer compared to the normal spacer. The hollow spacer also had a lower associated pressure drop for the stream flowing within the channel. For example, at the flow rate of about 20 ml/min, the pressure drop for the normal spacer was about 4.7 psi while the pressure drop for the hollow spacer was only 3.0 psi. The data suggests that use of the hollow spacer at very low TDS may incur a slightly higher voltage, potentially due to less turbulence leading to concentration polarization.

In a corresponding prophetic example, comparable ED experiments were run to test the impact of spacers having thinner screens compared to conventional spacers. A first run used conventional spacers in all compartments. A second run used spacers having thinner screens relative to a surrounding spacer frame in all dilute compartments and conventional spacers in all concentrating compartments. The voltage drop per cell pair was lower when thinner screens were used in the dilute compartments which led to an overall reduction in energy consumption. In a further prophetic example, seawater was desalinated from 35,000 ppm to 2800 ppm at a reduced energy consumption of about 15% using substantially the same ED device operated under substantially the same conditions but with thin screen spacers as discussed herein.

Having now described some illustrative embodiments of the invention, it should be apparent to those skilled in the art that the foregoing is merely illustrative and not limiting, having been presented by way of example only. Numerous modifications and other embodiments are within the scope of one of ordinary skill in the art and are contemplated as falling within the scope of the invention. In particular, although many of the examples presented herein involve specific combinations of method acts or system elements, it should be understood that those acts and those elements may be combined in other ways to accomplish the same objectives.

Those skilled in the art should appreciate that the parameters and configurations described herein are exemplary and that actual parameters and/or configurations will depend on the specific application in which the systems and techniques of the invention are used. Those skilled in the art should also recognize or be able to ascertain, using no more than routine experimentation, equivalents to the specific embodiments of the invention. It is therefore to be understood that the embodiments described herein are presented by way of example only and that, within the scope of the appended claims and equivalents thereto; the invention may be practiced otherwise than as specifically described.

Moreover, it should also be appreciated that the invention is directed to each feature, system, subsystem, or technique described herein and any combination of two or more features, systems, subsystems, or techniques described herein and any combination of two or more features, systems, subsystems, and/or methods, if such features, systems, subsystems, and techniques are not mutually inconsistent, is considered to be within the scope of the invention as embodied in the claims. Further, acts, elements, and features discussed only in connection with one embodiment are not intended to be excluded from a similar role in other embodiments.

As used herein, the term "plurality" refers to two or more items or components. The terms "comprising," "including," "carrying," "having," "containing," and "involving," whether in the written description or the claims and the like, are open-ended terms, i.e., to mean "including but not limited to." Thus, the use of such terms is meant to encompass the items listed thereafter, and equivalents thereof, as well as additional items. Only the transitional phrases "consisting of" and "consisting essentially of," are closed or semi-closed transitional phrases, respectively, with respect to the claims. Use of ordinal terms such as "first," "second," "third," and the like in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

What is claimed is:

1. An electrodialysis device, comprising:
a first compartment positioned between a pair of electrodes, the first compartment at least partially defined by a first ion selective membrane and a second ion selective membrane, the first compartment containing no electroactive media and having a flow channel width of greater than 3 cm; and
a spacer comprising a mesh screen surrounded by a frame that is thicker than the mesh screen, the spacer positioned between the first and second ion selective membranes and constructed and arranged to maintain separation between the mesh screen and each of the first and second ion selective membranes.

2. The device of claim 1, wherein the mesh screen is substantially centered within the first compartment relative to the first and second ion selective membranes.

3. The device of claim 1, wherein the mesh screen is positioned at an inlet channel and an outlet channel of the first compartment.

4. The device of claim 1, further comprising a cap constructed and arranged to cooperate with the spacer to support the first ion selective membrane.

5. The device of claim 4, wherein the thickness of the cap is greater than the thickness of the spacer.

6. The device of claim 1, wherein the mesh screen is thicker towards at least one of an inlet channel and an outlet channel of the first compartment relative to a remainder of the first compartment.

7. The device of claim 1, further comprising a second compartment at least partially defined by the second ion selective membrane and a third ion selective membrane.

8. The device of claim 7, wherein the first compartment comprises a dilute compartment and the second compartment comprises a concentrate compartment.

9. The device of claim 7, further comprising a second spacer comprising a second mesh screen, the second spacer positioned between the second and third ion selective membranes and constructed and arranged to maintain separation between the second mesh screen and the second and third ion selective membranes.

10. The device of claim 1, wherein the mesh screen is about 0.002 inch to about 0.02 inch thinner than the frame.

11. The device of claim 1, wherein the mesh screen comprises elastomeric ribs.

12. A method of treating water, comprising:
introducing the water to a diluting compartment of an electrodialysis device comprising a pair of electrodes;
pressurizing the diluting compartment to promote separation of a spacer mesh screen from an adjacent ion selective membrane in the diluting compartment of the electrodialysis device;
promoting transport of an ionic species in the water from the diluting compartment to a concentrating compartment of the electrodialysis device, each of the diluting compartment and the concentrating compartment containing no electroactive media; and
recovering treated water at an outlet of the diluting compartment.

13. The method of claim 12, wherein pressurizing the diluting compartment comprises applying a back pressure to the diluting compartment.

14. The method of claim 12, further comprising reversing polarity of an electric current applied through the electrodialysis device.

15. The method of claim 12, further comprising monitoring a concentration of the ionic species in the treated water.

16. The method of claim 12, wherein the spacer mesh screen is surrounded by a frame that is thicker than the mesh screen.

17. The method of claim 12, wherein pressurizing the diluting compartment comprises applying a pressure that is less than about 25 psi.

18. A method of facilitating the reduction of energy consumption in an electrodialysis device by at least 10%, the method comprising:
providing an electrodialysis device comprising at least one compartment partially defined by a first ion selective membrane and a second ion selective membrane, the at least one compartment containing no electroactive media and having a flow channel width of greater than 3 cm; and
providing a spacer comprising a mesh screen surrounded by a frame that is thicker than the mesh screen between the first and second ion selective membranes, the spacer constructed and arranged to maintain separation between the mesh screen and each of the first and second ion selective membranes.

19. The method of claim 18, wherein the mesh screen comprises elastomeric ribs.

* * * * *